(12) United States Patent
Takeda et al.

(10) Patent No.: US 9,716,578 B2
(45) Date of Patent: Jul. 25, 2017

(54) USER TERMINAL, RADIO BASE STATION APPARATUS, RADIO COMMUNICATION SYSTEM AND RADIO COMMUNICATION METHOD

(75) Inventors: Kazuaki Takeda, Tokyo (JP); Tetsushi Abe, Tokyo (JP); Yoshihisa Kishiyama, Tokyo (JP); Satoshi Nagata, Tokyo (JP); Daisuke Nishikawa, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 8 days.

(21) Appl. No.: 14/130,710

(22) PCT Filed: Jul. 13, 2012

(86) PCT No.: PCT/JP2012/067899
§ 371 (c)(1),
(2), (4) Date: Feb. 4, 2014

(87) PCT Pub. No.: WO2013/011933
PCT Pub. Date: Jan. 24, 2013

(65) Prior Publication Data
US 2014/0133434 A1    May 15, 2014

(30) Foreign Application Priority Data

Jul. 15, 2011  (JP) .................................. 2011-156243

(51) Int. Cl.
*H04W 4/00*   (2009.01)
*H04L 5/00*   (2006.01)
(Continued)

(52) U.S. Cl.
CPC ......... *H04L 5/0053* (2013.01); *H04B 7/0452* (2013.01); *H04W 72/042* (2013.01); *H04L 5/0007* (2013.01)

(58) Field of Classification Search
None
See application file for complete search history.

(56) References Cited

U.S. PATENT DOCUMENTS 8,005,039 B2      8/2011   Kamuf et al.
2010/0165847 A1*  7/2010   Kamuf et al. ................ 370/241
(Continued)

FOREIGN PATENT DOCUMENTS

| WO | 2010/053984 A2 | 5/2010 |
| WO | 2010/076300 A1 | 7/2010 |
| WO | 2012149908 A1  | 11/2012 |

OTHER PUBLICATIONS

Provisional U.S. Appl. No. 61/482,822; Liao, May 5, 2011.*
(Continued)

*Primary Examiner* — Kwang B Yao
*Assistant Examiner* — Juvena Loo
(74) *Attorney, Agent, or Firm* — Osha Liang LLP

(57) ABSTRACT

The present invention is designed to minimize the increase of user terminal power consumption even when downlink control channels are extended. A radio base station apparatus having: an allocation section that allocates downlink control information in a first control region from a top of a radio frame to a predetermined OFDM symbol and in a second control region that is frequency-divided with a data region in a region that is time-divided with the first control region, and also allocates decoding control information that indicates a user terminal to perform a decoding process for the second control region, in the first control region; and a transmission section that transmits the downlink control information and the decoding control information; and a user terminal having: a receiving section that receives the downlink control information and the decoding control information from the radio base station apparatus; and a decoding section that (Continued)

controls the decoding process for the second control region based on the decoding control information received, are provided.

5 Claims, 14 Drawing Sheets

(51) Int. Cl.
*H04B 7/0452* (2017.01)
*H04W 72/04* (2009.01)

(56) References Cited

U.S. PATENT DOCUMENTS

| | | | |
|---|---|---|---|
| 2011/0075624 A1* | 3/2011 | Papasakellariou et al. | 370/329 |
| 2011/0170496 A1* | 7/2011 | Fong et al. | 370/329 |
| 2011/0249633 A1* | 10/2011 | Hong | H04L 5/0053 370/329 |
| 2011/0268062 A1* | 11/2011 | Ji | H04L 5/0055 370/329 |
| 2011/0274066 A1* | 11/2011 | Tee et al. | 370/329 |
| 2012/0106465 A1* | 5/2012 | Haghighat et al. | 370/329 |
| 2012/0281646 A1* | 11/2012 | Liao | H04L 5/0094 370/329 |
| 2012/0320846 A1* | 12/2012 | Papasakellariou | H04W 72/042 370/329 |
| 2012/0320848 A1* | 12/2012 | Chen | H04L 5/0055 370/329 |
| 2013/0242890 A1* | 9/2013 | He | H04W 52/243 370/329 |

OTHER PUBLICATIONS

Provisional U.S. Appl. No. 61/497,330; Papasakellariou, Jun. 15, 2011.*
Provisional U.S. Appl. No. 61/498,063.*
International Search Report for corresponding International Application No. PCT/JP2012/067899, mailed Aug. 14, 2012 (2 pages).
3GPP TR25.913 V9.0.0; "3rd Generation Partnership Project; Technical Specification Group Radio Access Network; Requirements for Evolved UTRA (E-UTRA) and Evolved UTRAN (E-UTRAN) (Release 9);" Dec. 2009 (18 pages).
Nortel Networks; "Support of Wider Bandwidth for LTE-Advanced;" TSG-RAN1 #55, R1-084474; Prague, Czech; Nov. 10-14, 2008 (10 pages).
Office Action in counterpart Japanese Patent Application No. 2011-156243, mailed Jun. 9, 2015 (7 pages).
Extended European Search Report issued in corresponding European Application No. 12814271.8, mailed on Jan. 22, 2015 (8 pages).
Motorala; "Common PDCCH Design for Carrier Aggregation"; 3GPP TSG RANl #56bis, R1-091327; Seoul, Korea; Mar. 23-27, 2009 (2 pages).
Office Action in counterpart Japanese Pantent Application No. 2011-156243, dated Sep. 29, 2015 (7 pages).
Office Action issued in corresponding Chinese Patent Application No. 201280044898.1 dated Oct. 9, 2016 (with translation) (17 pages).

* cited by examiner

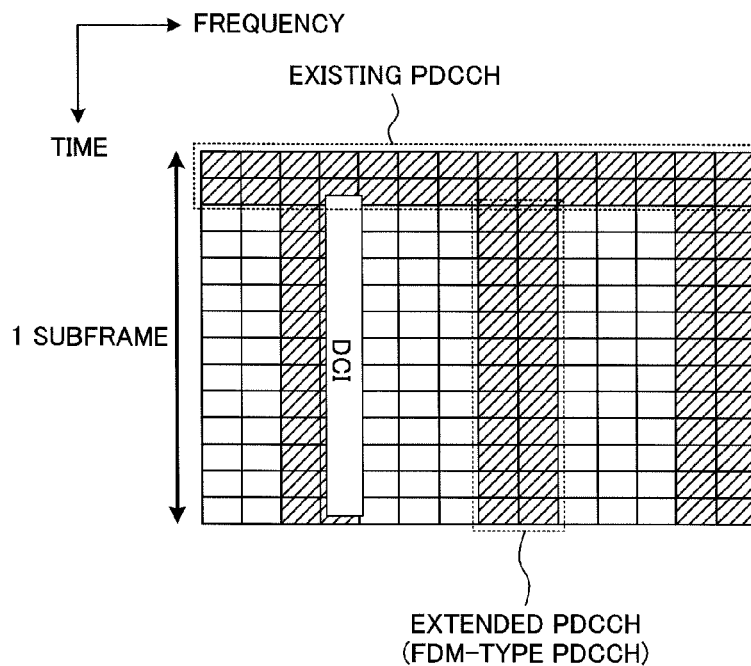
FIG. 4
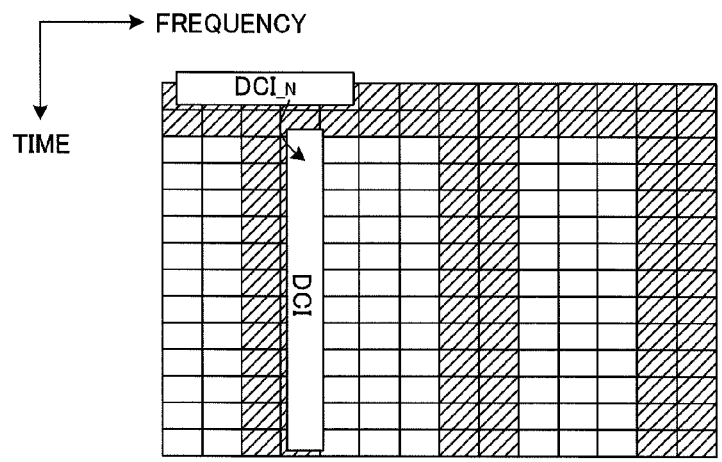
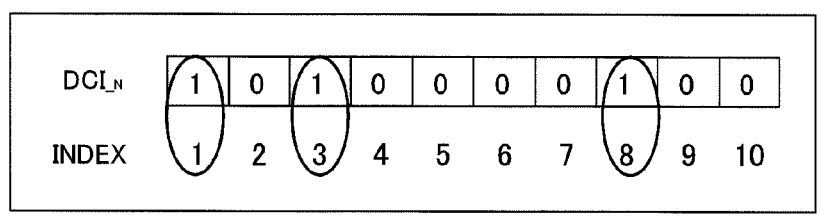
FIG. 5

| DCI$_N$ | 1 | 0 | 1 | 0 | 0 | 0 | 0 | 1 | 0 | 0 |
|---------|---|---|---|---|---|---|---|---|---|---|
| INDEX | 1 | | 2 | | 3 | | 4 | | 5 | |

FIG. 6A

| BIT FIELD | CONTENTS |
|-----------|----------|
| 00 | NO DCI IN X-PDCCH |
| 01 | QPSK FOR DCI IN X-PDCCH |
| 10 | 16QAM FOR DCI IN X-PDCCH |
| 11 | 64QAM FOR DCI IN X-PDCCH |

FIG. 6B

| BIT FIELD | CONTENTS |
|-----------|----------|
| 00 | NO DCI IN X-PDCCH |
| 01 | RANK 1 FOR DCI IN X-PDCCH |
| 10 | RANK 2 FOR DCI IN X-PDCCH |
| 11 | RANK 4 FOR DCI IN X-PDCCH |

FIG. 6C

USER TERMINAL, RADIO BASE STATION APPARATUS, RADIO COMMUNICATION SYSTEM AND RADIO COMMUNICATION METHOD

TECHNICAL FIELD

The present invention relates to a user terminal, a radio base station apparatus, a radio communication system and a radio communication method in a next generation radio communication system.

BACKGROUND ART

For the UMTS (Universal Mobile Telecommunication System) network, for the purposes of further increasing high-speed data rates, providing low delay and so on, long-term evolution (LTE) has been under study (Non-Patent Literature 1). LTE uses, as multiple-access schemes, a scheme that is based on OFDMA (Orthogonal Frequency Division Multiple Access) on the downlink, and a scheme that is based on SC-FDMA (Single Carrier Frequency Division Multiple Access) on the uplink.

Also, successor systems of LTE (referred to as, for example, "LTE-Advanced" or "LTE enhancement" (hereinafter referred to as "LTE-A")) are under study for the purposes of further broadbandization and increased speed from LTE. In LTE (Rel. 8) and LTE-A (Rel. 9 and Rel. 10), MIMO (Multi Input Multi Output) techniques are under study as radio communication techniques to transmit and receive data by a plurality of antennas and improve spectral efficiency. In a MIMO system, a plurality of transmitting/receiving antennas are provided in the transmitter/receiver, so that different transmission information sequences are transmitted from different transmitting antennas at the same time.

CITATION LIST

Non-Patent Literature

Non-Patent Literature 1: 3GPP TR 25.913 "Requirements for Evolved UTRA and Evolved UTRAN"

SUMMARY OF THE INVENTION

Technical Problem

Now, in successor systems of LTE (for example, Rel. 9 and Rel. 10), multiple-user MIMO (MU-MIMO) to transmit transmission information sequences to different users from different transmitting antennas at the same time, is defined. This MU-MIMO transmission is also studied for application to a Hetnet (Heterogeneous network) and CoMP (Coordinated Multi-Point) transmission.

In future systems, the capacity of a downlink control channel to transmit downlink control information is expected to run short, due to an increased number of users to be connected to a radio base station apparatus. Consequently, with conventional radio resource allocation methods, there is a threat that the characteristics of future systems such as MU-MIMO transmission cannot be optimized.

As a method of solving such problems, a method of extending the region where a downlink control channel is allocated and transmitting more downlink control information may be possible. Meanwhile, there is a threat that, following the expansion of downlink control channels, a user terminal has to decode more downlink control channels, and the power consumption of the user terminal increases.

The present invention has been made in view of the above, and it is therefore an object of the present invention to provide a user terminal, a radio base station apparatus, a radio communication system and a radio communication method that can minimize the increase of user terminal power consumption even when the downlink control channel is extended.

Solution to Problem

A radio communication system according to the present invention includes: a radio base station apparatus having: an allocation section that allocates downlink control information in a first control region from a top of a radio frame to a predetermined OFDM symbol and in a second control region that is frequency-divided with a data region in a region that is time-divided with the first control region, and also allocates decoding control information that indicates a user terminal to perform a decoding process for the second control region, in the first control region; and a transmission section that transmits the downlink control information and the decoding control information; and a user terminal having: a receiving section that receives the downlink control information and the decoding control information from the radio base station apparatus; and a decoding section that controls a decoding process for the second control region based on the decoding control information received.

A radio base station apparatus according to the present invention includes: an allocation section that allocates downlink control information in a first control region from a top of a radio frame to a predetermined OFDM symbol and in a second control region that is frequency-divided with a data region in a region that is time-divided with the first control region, and also allocates decoding control information that indicates a user terminal to perform a decoding process for the second control region, in the first control region; and a transmission section that transmits the downlink control information and the decoding control information to a user terminal.

A user terminal according to the present invention includes: a receiving section that receives downlink control information that is allocated in a first control region from a top of a radio frame to a predetermined OFDM symbol and in a second control region that is frequency-divided with a data region in a region that is time-divided with the first control region, and also receives decoding control information that is allocated in the first control region and that indicates a user terminal to perform a decoding process for the second control region; and a decoding section that control the decoding process for the second control region based on the decoding control information.

A radio communication method according to the present invention is a radio communication method of transmitting downlink control information generated in a radio base station apparatus to a user terminal and controlling demodulation of the downlink control information received in the user terminal, and this method includes the steps in which: the radio base station apparatus: allocates downlink control information in a first control region from a top of a radio frame to a predetermined OFDM symbol and in a second control region that is frequency-divided with a data region in a region that is time-divided with the first control region, and also allocates decoding control information that indicates a user terminal to perform a decoding process for the second control region, in the first control region; and transmits the downlink control information and the decoding control information; and the user terminal: receives the downlink control information and the decoding control information from the radio base station apparatus; and controls the decoding process for the second control region based on the decoding control information received.

Technical Advantage of the Invention

According to the present invention, it is possible to minimize the increase of user terminal power consumption even when a downlink control channel is extended.

BRIEF DESCRIPTION OF DRAWINGS

FIG. 4 is a diagram to explain a subframe configuration of an FDM-type PDCCH;

FIG. 5 is a diagram to explain information ($DCI_{\_N}$) to represent user terminals that decode the second control region;

FIG. 6 provides diagrams to explain information ($DCI_{\_N}$) to represent user terminals that decode the second control region;

DESCRIPTION OF EMBODIMENTS

Figure 1:
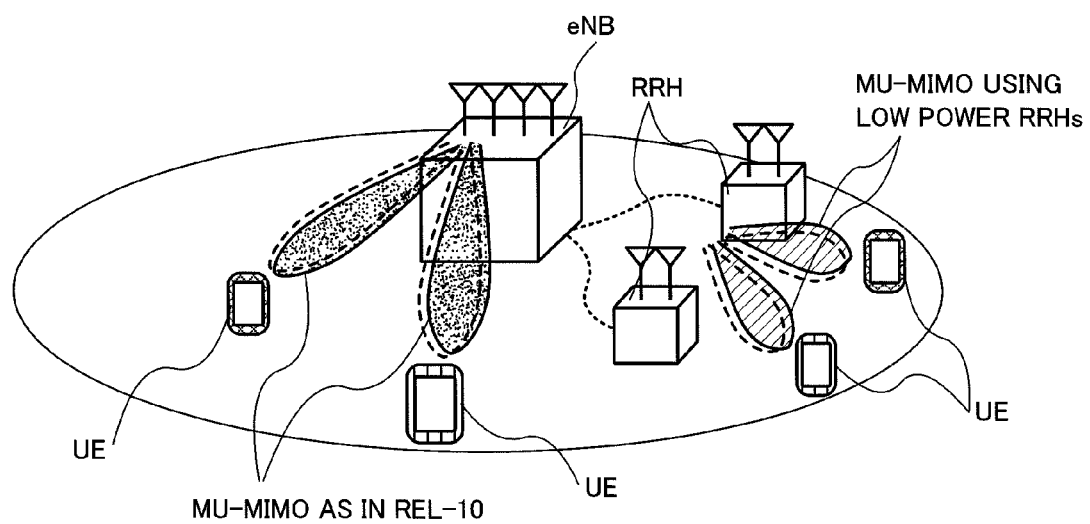
FIG. 1 is a schematic diagram of a Hetnet where MU-MIMO is applied.

FIG. 1 is a diagram to show an example of a Hetnet where MU-MIMO transmission is applied. The system shown in FIG. 1 is hierarchicaly configured, by providing small base station apparatus RRHs (Remote Radio Heads) having local coverage areas, in the coverage area of a radio base station apparatus eNB (eNodeB). In downlink MU-MIMO transmission in such a system, data for a plurality of user terminal UEs (User Equipment) #1 and #2 is transmitted at the same time from a plurality of antennas of the radio base station apparatus eNB. Also, from a plurality of antennas of a plurality of small base station apparatus RRHs, data for a plurality of user terminal UEs #3 and #4 is transmitted at the same time.

Figure 2:
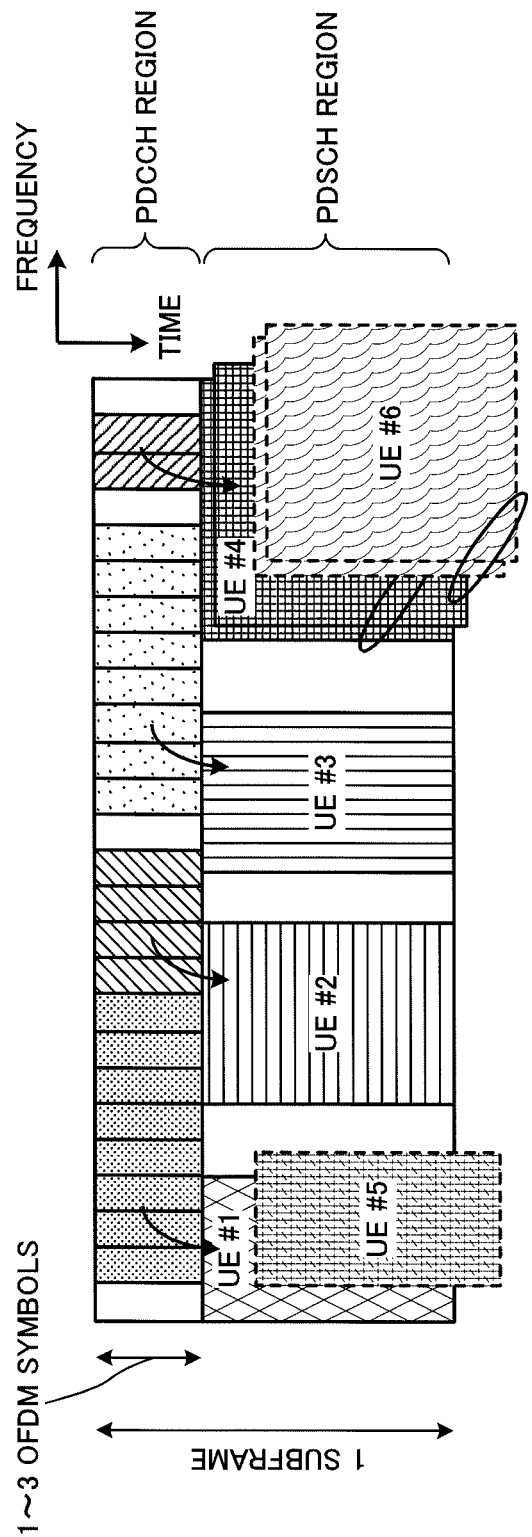
FIG. 2 is a diagram to show an example of a subframe where downlink MU-MIMO transmission is performed.

FIG. 2 is a diagram to show an example of subframes where downlink MU-MIMO transmission is applied. As shown in FIG. 2, in a radio communication system where MU-MIMO transmission is applied, in each subframe, predetermined symbols (one to three OFDM symbols) from the top are secured as a radio resource region (PDCCH region) for a downlink control channel (PDCCH: Physical Downlink Control Channel). Also, in radio resources after the predetermined number of symbols from the subframe top, a radio resource region (PDSCH region) for a downlink data channel (PDSCH: Physical Downlink Shared CHannel) is secured.

In the PDCCH region, downlink control information (DCI: Downlink Control Information) for user terminal UEs (here, UEs #1 to #4) is allocated. Each downlink control information (DCI) includes allocation information in the PDSCH region. In this way, in each subframe, downlink data signals for user terminal UEs, and downlink control information (DCI) signals for receiving that downlink data, are time-division-multiplexed and transmitted.

As described above, in MU-MIMO transmission, it is possible to transmit data for a plurality of terminal UEs in the same time and the same frequency. Consequently, in the PDSCH region of FIG. 2, it may be possible to multiplex data for user terminal UE #5 in the same frequency region as for data for user terminal UE #1. Likewise, it may be possible to multiplex data for user terminal UE #6 in the same frequency region as for data for user terminal UE #4.

However, in the PDCCH region of FIG. 2, there is no PDCCH region for transmitting downlink control information (DCI) for user terminal UEs #5 and #6. Consequently, the number of user terminal UEs to be multiplexed in the PDSCH region is limited. In this way, even if the number of user terminals to be multiplexed in the same radio resources is increased by MU-MIMO transmission, the PDCCH region to transmit downlink control information (DCI) runs short, and, as a result, cases might occur where it is not possible to optimize the effect of improving the efficiency of use of the PDSCH region.

Figure 3A:
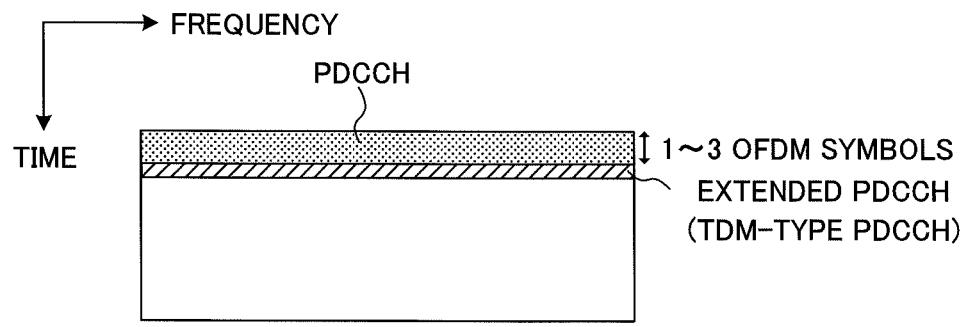
FIG. 3 provides diagrams to explain extended PDCCHs (TDM type and FDM type)
Figure 3B:
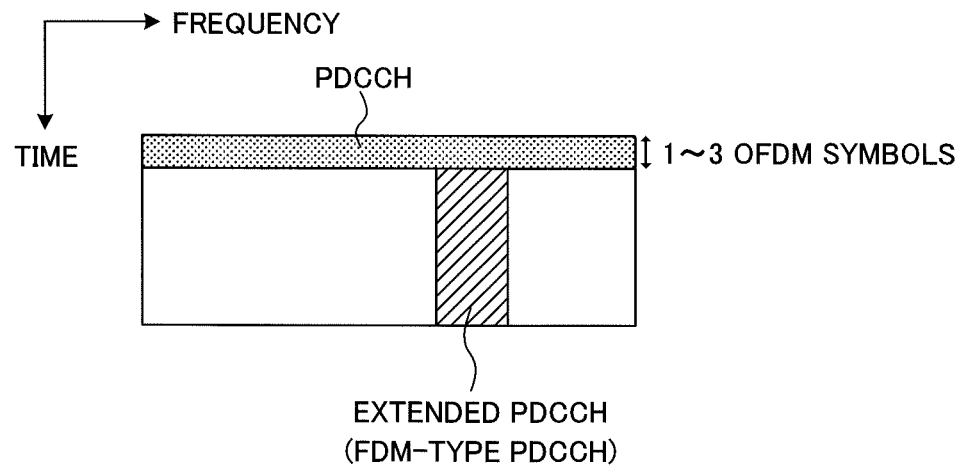

To solve such shortage of the PDCCH region, it may be possible to extend the PDCCH allocation region outside the control region of maximum three OFDM symbols from the subframe top (that is, extend the PDCCH region to the existing PDSCH region). As the method of extending the PDCCH allocation region, a method to extend the PDCCH region, which is maximum three OFDM symbols from the subframe top, to four OFDM symbols or more (time-division (TDM) approach (see FIG. 3A)), and a method to frequency-divide the PDSCH region for use as a new PDCCH region (frequency-division (FDM) approach (see FIG. 3B)), may be possible.

The present inventors have studied this, and found out that, when the latter frequency division approach is applied, it becomes possible to achieve beam forming gain by performing demodulation using user-specific reference signals (DM-RSs: DeModulation-Reference Signals), so that this is particularly effective to extend the PDCCH.

On the other hand, when the PDCCH region is extended as described above, a user terminal UE has to perform baseband signal processing such as a fast Fourier transform (FFT), channel estimation and decoding, for the OFDM symbols where an extended PDCCH is allocated, in addition to the PDCCH allocated to maximum three OFDM symbols from the radio frame top, and acquire downlink control information. In the user terminal, such baseband signal processing increase, and, due to this, the user terminal's power consumption increases.

However, depending on the condition of traffic of the radio communication system (for example, the number of users in the cell), cases may occur where it is not necessary to transmit downlink control information using extended PDCCHs over all of the continuing radio frames. Also, even when downlink control information is transmitted using extended PDCCHs, in a given radio frame, there may be a user terminal, downlink control information for which is not allocated in the extended PDCCH. In this case, the decoding process for the extended PDCCH, performed in user terminals other than the specific user terminal having its downlink control information included in that extended PDCCH, cause a further increase of user terminal power consumption.

So, the present inventors have conceived of reducing wasteful decoding processes in user terminals and saving power consumption, by controlling the user terminals to perform the decoding process for an extended PDCCH, when the PDCCH allocation region is extended to allocate downlink control information.

Now, an embodiment of the present invention will be described below in detail. Note that, in the following description, the first example to control the decoding process for extended PDCCHs by user terminals in predetermined radio frames, and a second example to control the decoding process for extended PDCCHs, only in limited, specific radio frames, on a per user terminal basis, in continuous radio frames, will be described separately. Obviously, it is possible to apply the first example and the second example in combination as well.

First Example

First, an example of a subframe configuration in a radio communication system will be described. FIG. 4 is a diagram to show a subframe configuration in which an existing PDCCH and FDM-type PDCCHs (also referred to as "enhanced PDCCHs," "extended PDCCHs," "UE-PD-CCHs," and so on) are arranged. In the first control region, which is several OFDM symbols (one to three OFDM symbols) from the top of a subframe, an existing PDCCH is arranged over the entire system band, and, in radio resources following the OFDM symbols where the existing PDCCH is arranged, FDM-type PDCCHs are arranged.

An FDM-type PDCCH is allocated in a second control region that is frequency-divided with a data region (PDSCH region), in a region that is time-divided with the first control region. The bandwidth of one FDM-type PDCCH in the frequency domain is the size of the radio resource scheduling unit—for example, one resource block (RE).

In the first control region where the existing PDCCH is arranged and the second control regions where extended PDCCHs are arranged, downlink control information (DCI) for user terminals is allocated. The downlink control information (DCI) for user terminals includes allocation information in the PDSCH region. In the LTE-A system (Rel. 10), as downlink control information, a downlink scheduling assignment (DL assignment) for controlling a downlink data channel (PDSCH), an uplink scheduling grant (UL Grant) for controlling an uplink data channel (PUSCH) and so on are defined.

With the first example of the present embodiment, in the above-described subframe configuration, information that indicates the user terminals to perform the decoding process for the second control region (hereinafter also referred to as "decoding control information") is allocated in the first control region, so that the user terminals to decode the downlink control information signal allocated in the extended PDCCH are controlled. When receiving downlink control information from a radio base station apparatus, a user terminal controls the demodulation of the downlink control information signal of the second control region, based on the decoding control information that is acquired by performing the decoding process of the first control region.

In this way, by reporting information related to user terminals having downlink control information allocated in extended PDCCHs using an existing PDCCH, a user terminal, downlink control information for which is allocated in the extended PDCCH, is able to perform the decoding process for the second control region on a selective basis. By this means, user terminals, downlink control information for which is not allocated in the extended PDCCHs, do not perform the demodulation process for the extended PDCCHs, so that it is possible to reduce wasteful decoding processes and save the battery consumption of the user terminals.

Although decoding control information that indicates the user terminals to perform the decoding process for the second control region may be included in the DCI format defined in the LTE-A system (Rel. 10), it is also possible to define new DCI (hereinafter referred to as "$DCI_{\_N}$") and transmit this using the PDCCH of the first control region. In this case, it is preferable to allocate the decoding control information ($DCI_{\_N}$) in a common search space in the PDCCH arranged in the first control region. All the user terminals in the same cell perform the decoding process (blind decoding) for the PDCCH corresponding to the common search space, so that, by allocating decoding control information in the common search space, it is possible to control the decoding process for the second control regions with respect to all user terminals.

When the decoding control information is defined as new downlink control information ($DCI_{\_N}$), as shown in FIG. 5, it is possible to define index numbers (user numbers) that identify the user terminals, and bit information that represents decoding information for extended PDCCHs, in combination. A user terminal is able to determine whether or not to perform the decoding process for the second control region, by detecting bit information that corresponds to the index number (user number) that is associated with that user terminal.

For example, a configuration may be possible in which, when the bit information in the bit field to correspond to each index number is one bit, the decoding process for the second control region is not performed when the bit information is "0," and the decoding process for the second control region is performed when the bit information is "1." Note that it is possible to report index numbers to user terminals by higher layer signals. In FIG. 5, the user terminals having index numbers associated with 1, 3 and 8 decode the downlink control signal allocated in the second control region, and the other user terminals do not perform decoding.

Also, a configuration may be possible in which the same index number is shared between a plurality of user terminals in the same cell. By this means, it is possible to support more user terminals by one index number. By this means, it is possible to reduce the size of decoding control information even when the number of user terminals in the same cell is large.

Also, as described above, when decoding control information is defined as new DCI, it is preferable to make the size of the format for the decoding control information ($DCI_N$) the same as the size of the format for other DCI allocated in the first control region. When a user terminal performs blind decoding, if the DCI format size is the same, it is possible to check a plurality of DCI formats at the same time by one blind decoding. Consequently, by making the size of the format for decoding control information ($DCI_N$) the same as the size of the format for other DCI, it is possible to minimize the increase of the number of times to try blind decoding.

For example, it is possible to make the format size of decoding control information ($DCI_N$) the same size as DCI format 0 having an uplink scheduling grant as its content and DCI formats 1A/3/3A having a downlink scheduling assignment as its content.

Note that, although a case has been shown in the above description where decoding control information ($DCI_N$) is defined as new DCI and transmitted to user terminals, it is equally possible to provide a configuration to add other information such as the modulation scheme, rank, and so on, in addition to the decoding control information. For example, as shown in FIG. 6A, it is possible to make the bit field to correspond to each index number bigger than one bit (here, two bits), and define decoding control information in combination with information to represent the modulation scheme and the rank in MIMO transmission.

FIG. 6B shows an example of a mapping table in which decoding control information and the modulation scheme are combined by bit information of two bits and defined as $DCI_N$. To be more specific, when the bit information is "00," the decoding process for the control signal in an extended PDCCH is not performed, and when the bit information is "01," "10" and "11," the decoding process for the control signal in the extended PDCCH is performed, and also the modulation schemes of QPSK, 16QAM and 64QAM are applied, respectively. In this way, by reporting the modulation schemes to apply to extended PDCCHs to user terminals, it is possible to reduce the number of times the user terminals try blind decoding.

FIG. 6C shows an example of a mapping table in which decoding control information and the rank (for example, the rank in MIMO transmission) are combined by bit information of two bits and defined as $DCI_N$. To be more specific, when the bit information is "00," the decoding process for the control signal in an extended PDCCH is not performed, and when the bit information is "01," "10" and "11," the decoding process for the control signal in the extended PDCCH is performed, and the ranks (RIs: Rank Indicators) 1, 2 and 4 are selected, respectively. In this way, by reporting the ranks to apply to extended PDCCHs to user terminals, it is possible to reduce the number of times the user terminals try blind decoding.

Also, the index number associated with each user terminal can be reported to the user terminal apparatus by a higher layer signal.

In this way, by controlling the user terminals to decode the extended PDCCH by allocating information that indicates the user terminals to perform the decoding process for the extended PDCCH arranged in the second control region in the first control region, it is possible to reduce wasteful decoding processes in user terminals, and save power consumption.

Second Example

As a second example of the present embodiment, a configuration to selectively allocate downlink control information to user terminals, only in the limited extended PDCCHs of specific radio frames in a continuous radio frame, will be described.

Figure 7:
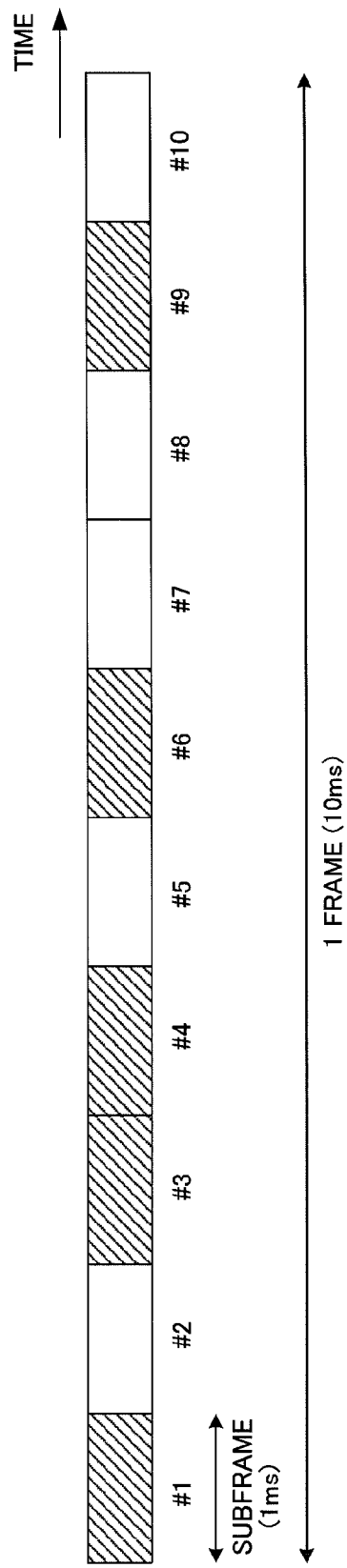
FIG. 7 is a diagram to explain a specific radio frame where, limited to extended PDCCHs in continuous radio frames, downlink control signals are allocated.

FIG. 7 shows a system configuration where, as a continuous radio frame, one frame is formed with ten subframes (#1 to #10). Also, a case is shown here where downlink control information for predetermined user terminals is allocated in the extended PDCCHs of specific subframes (#1, #3, #4, #6 and #9). Note that, in a continuous radio frame, the first control region, where an existing PDCCH is allocated, is arranged in the region from the top of each radio frame to a predetermined OFDM symbol. Also, an extended PDCCH is allocated in a second control region that is frequency-divided with a data region in a region that is time-divided with the first control region.

In the case shown in FIG. 7, in subframes (#2, #5, #7, #8 and #10) other than specific radio subframes, downlink control information for a target user terminal is not allocated in the extended PDCCH. Consequently, in these subframes, the user terminal performs the decoding process for the existing PDCCH of the first control region.

On the other hand, in the specific subframes, downlink control information for the target user terminal is allocated in the extended PDCCH, so that the user terminal performs the decoding process for the extended PDCCH of the second control region. Note that, in the specific subframes, the user terminal apparatus may perform the decoding process for the PDCCH of the first control region, or may perform the decoding process only with respect to the extended PDCCH.

Also, to the user terminal, information (subframe pattern information) that indicates the specific subframes where downlink control information for that user terminal is allocated in the extended PDCCH is reported, and the user terminal performs the decoding process of the control information based on the subframe pattern information.

The subframe pattern information may be configured to be separately reported to a plurality of users in the same cell. In this case, a configuration to report the subframe pattern information to each user terminal apparatus by higher layer signals separately may be provided as well. By this means, a user terminal is able to demodulate the extended PDCCH, only in limited subframes where downlink control information for that user terminal is allocated in the extended PDCCH, in a continuous radio frame. As a result, it is possible to reduce wasteful demodulation processes in user terminal apparatuses and prevent an increase in power consumption.

Also, a configuration may be provided in which subframe pattern information is reported by a broadcast signal from a radio base station apparatus to a plurality of user terminals in the same cell. This is effective when allocating an extended PDCCH only in specific radio frames. Note that, in this case, it is possible to combine with the configuration shown in the above first example, and allocate decoding control information in the first control region, in specific radio frames, and control the decoding process for the second control region.

In this way, for each user terminal apparatus, it is possible to minimize the increase of the user terminal's power consumption by allocating downlink control information for the user terminal in an extended PDCCH, only in limited specific radio frames, in a continuous radio frame, and controlling the decoding process for the extended PDCCH.

(Allocation of FDM-Type PDCCH)

Next, allocation of the above-described extended PDCCH to the system band will be described with reference to the accompanying drawings.

Figure 8:
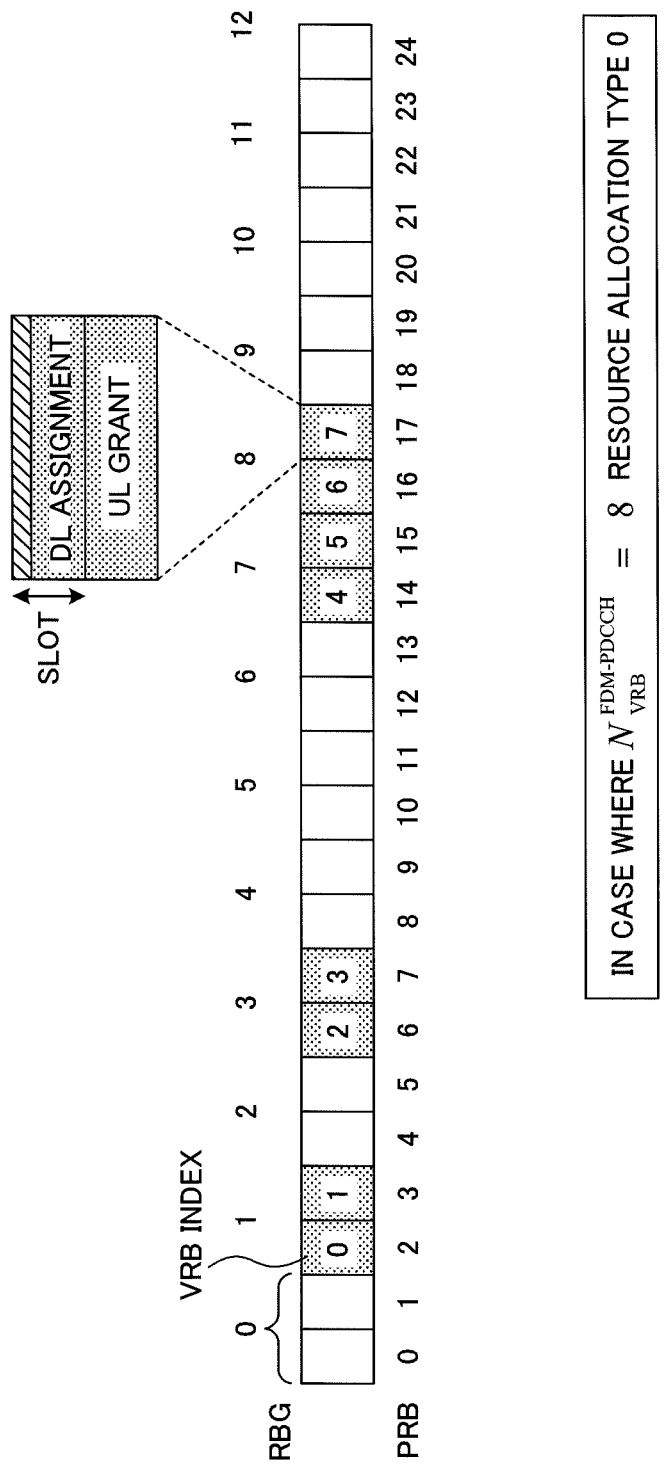
FIG. 8 is a diagram to show an example of allocation of an extended PDCCH to a system band.

Note that FIG. 8 shows a case where eight ($N_{VRB}$=8) virtual resource block (VRB) sets are set as an extended PDCCH, in a cell bandwidth formed with twenty-five physical resource blocks (PRBs). Also, FIG. 8 shows a case where the resource allocation type is 0 (resource allocation type 0). Obviously, the configuration of an extended PDCCH is by no means limited to this.

As resource block allocation types, there are three different types (resource allocation types 0, 1 and 2). The resource block allocation types 0 and 1 support discontinuous frequency arrangement in the frequency domain, and the type 2 supports only continuous frequency arrangement. The resource block allocation type 0 is represented in groups of neighboring resource blocks, not in individual resource blocks in the frequency domain, thereby reducing the bitmap size. In FIG. 8, the cell bandwidth is twenty-five resource blocks, so that the size of a resource block group (RBG) is two. In this case, eight VRB sets are arranged in PRBs (RBGs=1, 3, 7 and 8) in units of two.

The radio base station apparatus reports $N_{VRB}$ VRB sets to user terminals as an extended PDCCH by higher layer signals. When setting as shown in FIG. 8, predetermined RBGs (here, RBGs=1, 3, 7 and 8) are reported to user terminals. Also, the VRBs are numbered by VRB indices, in order from the smallest PRB index (RBG index).

The resource blocks of an extended PDCCH may be configured to allocate a downlink scheduling assignment (for example, DCI formats 1A, 2A and so on) in the first-half slot (the first slot), and allocate an uplink scheduling grant (for example, DCI formats 0 and 4) in the second-half slot (the second slot). By allocating a downlink scheduling assignment in the first-half slot, it is possible to demodulate downlink data signals quickly. Note that the configuration of the resource blocks of extended PDCCHs is by no means limited to this.

Also, for the format of an extended PDCCH, like the existing PDCCH, it is possible to apply either the method ("with cross interleaving") of allocating each user's downlink control signal in control channel element (CCE) units, which are formed with a plurality of resource element groups (REGs), or the method ("without cross interleaving") of allocating each user's downlink control signal in PRB units.

In the event of "with cross interleaving," user terminals perform blind decoding in search spaces defined by CCE indices. In the event of "without cross interleaving," user terminals perform blind decoding in search spaces defined by PRB indices. For example, in the above first example, when blind decoding for an extended PDCCH is performed based on decoding control information allocated in the first control region, either "with cross interleaving" or "without cross interleaving" is applied. Also, with the second example, when blind decoding for the extended PDCCH is performed in specific subframes, either "with cross interleaving" or "without cross interleaving" is applied. Now, blind decoding in each format will be described below.

<With Cross Interleaving>

In the event of "with cross interleaving," the radio base station apparatus allocates CCEs, which are formed with continuous REGs in radio resources that are available for use, in extended PDCCHs. One CCE is formed with nine REGs. Also, one REG is formed with four resource elements. For example, the radio base station apparatus determines the number of CCEs to allocate (aggregation level Λ (=1, 2, 4, 8)), based on the received quality reported from each user terminal. Then, in extended PDCCHs, the radio base station apparatus sets REGs to match the number of CCEs corresponding to the aggregation level of each user terminal.

Figure 9:
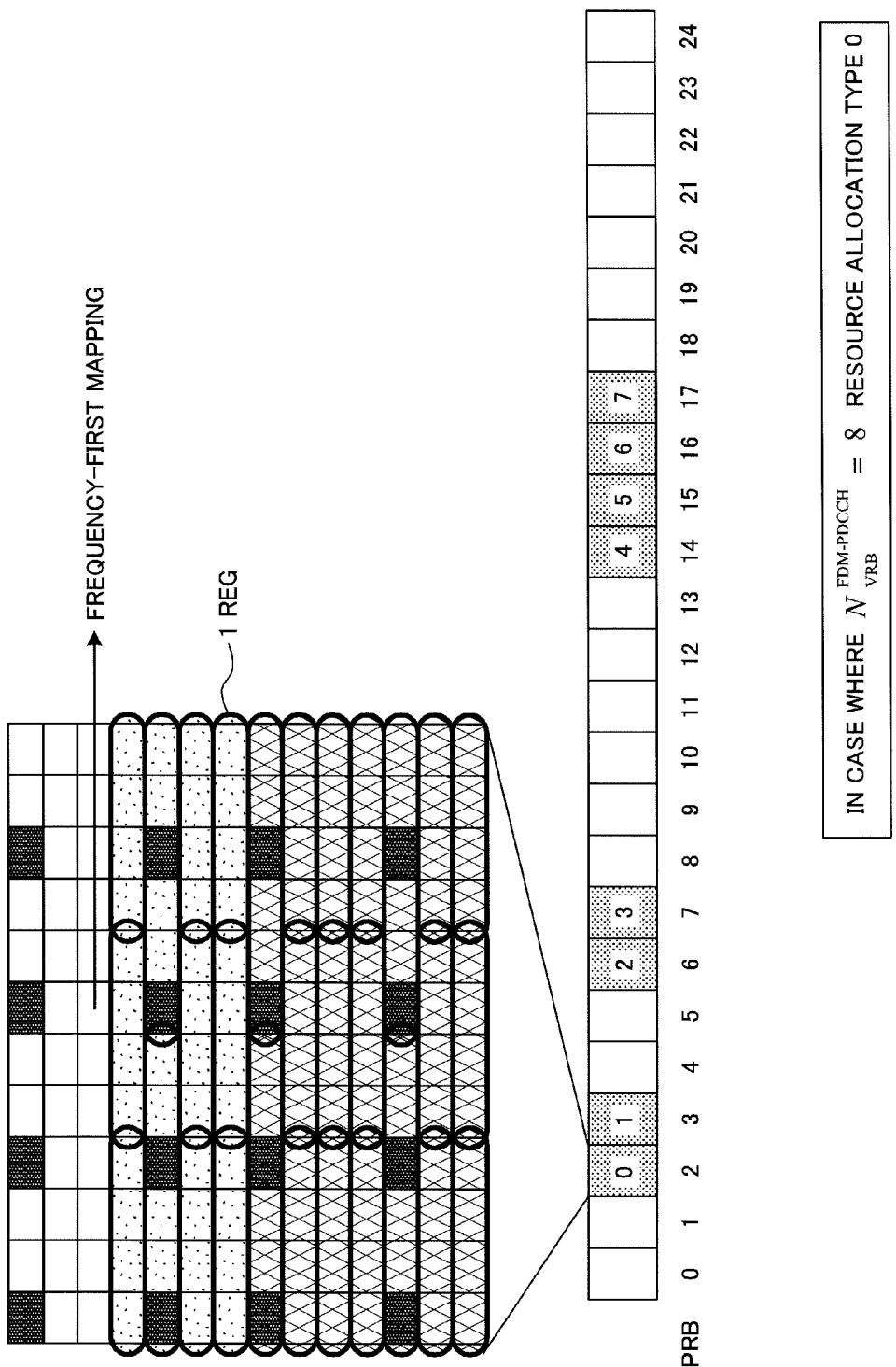
FIG. 9 provides diagrams to explain an example of search spaces when the format of an extended PDCCH is "with cross interleaving;"

For example, to a cell bandwidth formed with twenty-five PRBs, when eight ($N_{VRB}$=8) VRB sets are arranged as an extended PDCCH, in the resource allocation type 0, REGs are arranged in the radio resources of the PRBs as shown in FIG. 9.

Nine REGs to constitute one CCE are allocated, to the radio resources of the PRBs constituting an extended PDCCH, to continue in the frequency direction. Note that, in the radio resources of PRBs, REGs are allocated to the resource elements that are allocated as reference signals such as CRSs (Cell-specific Reference Signals), except for these resource elements. Also, the radio base station apparatus allocates continuous CCEs to the extended PDCCH of each user terminal, based on the aggregation level of each user terminal.

A user terminal does not know the CCE where the extended PDCCH signal for that user terminal is allocated or which aggregation level is selected, and therefore performs the extended PDCCH decoding process for all the CCEs that may be allocated (blind decoding).

Also, the radio base station apparatus is able to set search spaces on a per user terminal basis, in order to reduce the number of times a user terminal tries blind decoding for the extended PDCCH. In this case, the user terminal has only to perform blind decoding for the extended PDCCH in the corresponding search space.

<Without Cross Interleaving>

In the event of "without cross interleaving," the radio base station apparatus allocates the downlink control signal of each user terminal in extended PDCCHs in VRB units. For example, the radio base station apparatus determines the number of VRBs (aggregation level Λ (=1, 2, 4, 8)) to allocate in a continuous manner, based on the received quality reported from each user terminal. Then, the determined number of VRBs are allocated as radio resources for the extended PDCCH signals for user terminals.

In the event of "without cross interleaving," the radio base station apparatus allocates each user's downlink control signal in extended PDCCHs, in VRB units. Also, in the radio resources where extended PDCCHs may be arranged, DM-RSs, which are user-specific downlink reference signals, are arranged. Consequently, it is possible to demodulate the extended PDCCHs using the DM-RSs. In this case, channel estimation is possible in PRB units, so that it is possible to effectively execute beam forming for each mobile terminal apparatus UE.

A user terminal monitors a plurality of extended PDCCH candidates that may be set by a higher layer signal. To the user terminal, the VRBs of the extended PDCCH where DCI for that user terminal is allocated, and the aggregation level that is selected, are not reported. Consequently, the user terminal performs the extended PDCCH decoding process with respect to all the VRBs where DCI for that user terminal may be allocated.

Also, the radio base station apparatus is able to set search spaces on a per user terminal basis, in order to reduce the number of times a user terminal tries blind decoding for the extended PDCCH. In this case, the user terminal has only to perform blind decoding for the extended PDCCH in the corresponding search space (see FIG. 10).

Figure 10:
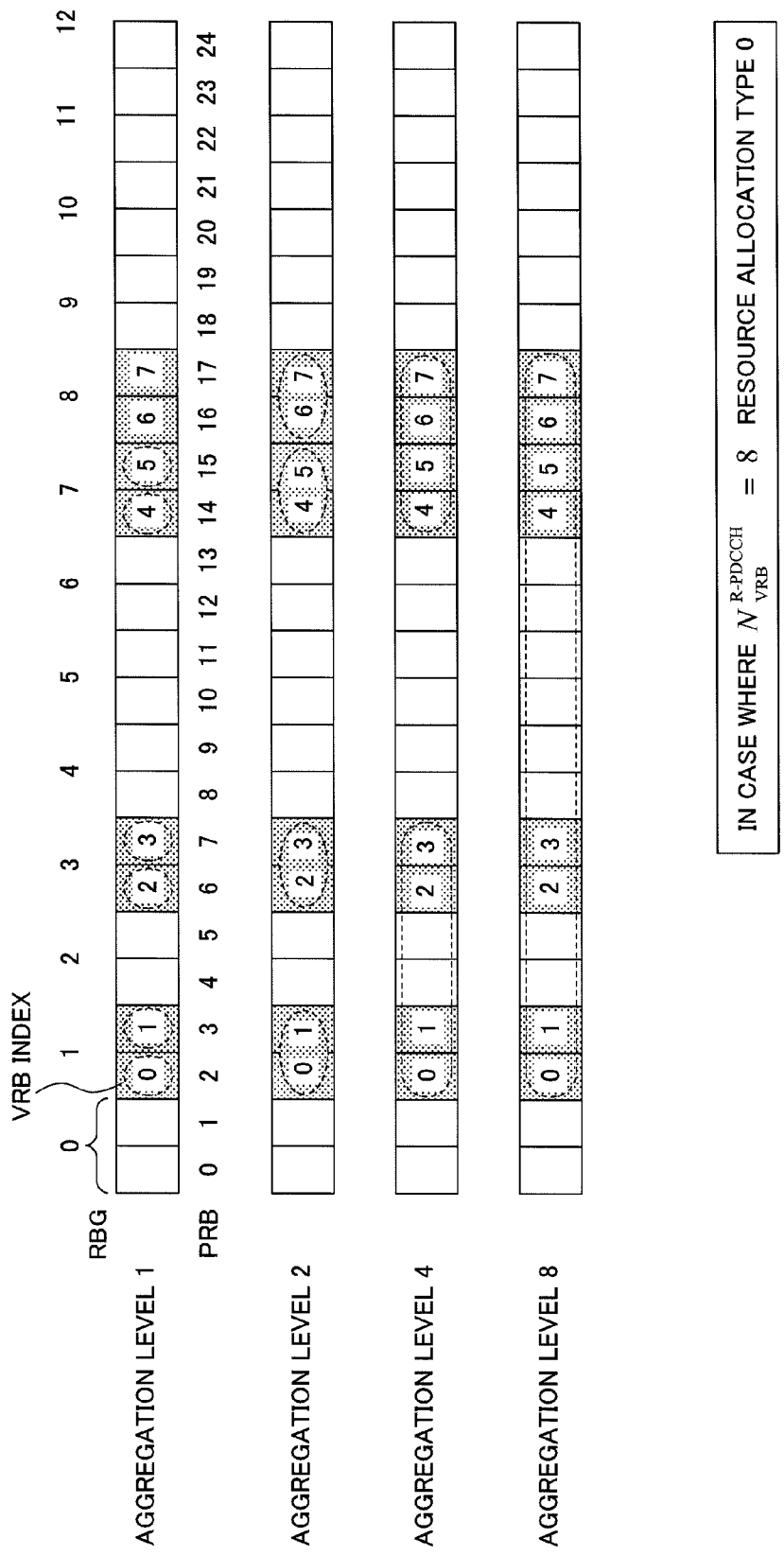
FIG. 10 is a diagram to explain an example of search spaces when the format of an extended PDCCH is "without cross interleaving;"

FIG. 10 shows a case where the numbers of PDCCH candidates, corresponding to aggregation levels Λ (=1, 2, 4 and 8), are 6, 6, 2 and 2, respectively. Note that, although a case is shown here where the aggregation levels are 6, 6, 2 and 2, obviously, the aggregation levels and the numbers of PDCCH candidates are not limited to these.

At aggregation level 1, six search spaces are set in VRBs #0 to #5. At aggregation level 2, four search spaces are set in VRBs #0 to #7, in two-VRB units. At aggregation level 4, two search spaces are set in VRBs #0 to #7, in four-VRB units. At aggregation level 8, one search space is set in VRBs #0 to #7, in eight-VRB units. Note that, at aggregation levels 2 and 8, the search spaces overlap due to shortage of the number of VRBs.

Then, a user terminal performs blind decoding in the search space according to the aggregation level and acquires the DCI allocated to the VRBs. In this way, in the event of "without cross interleaving," each user's DCI is allocated in PRB units, and blind decoding is performed in search spaces defined by VRB indices.

(Configuration of Radio Communication System)

Now, a radio communication system 1 having a user terminal 10 and a radio base station apparatus according to the present embodiment will be described below with reference to FIG. 11. The user terminal 10 and the radio base station apparatus 20 support LTE-A.

Figure 11:
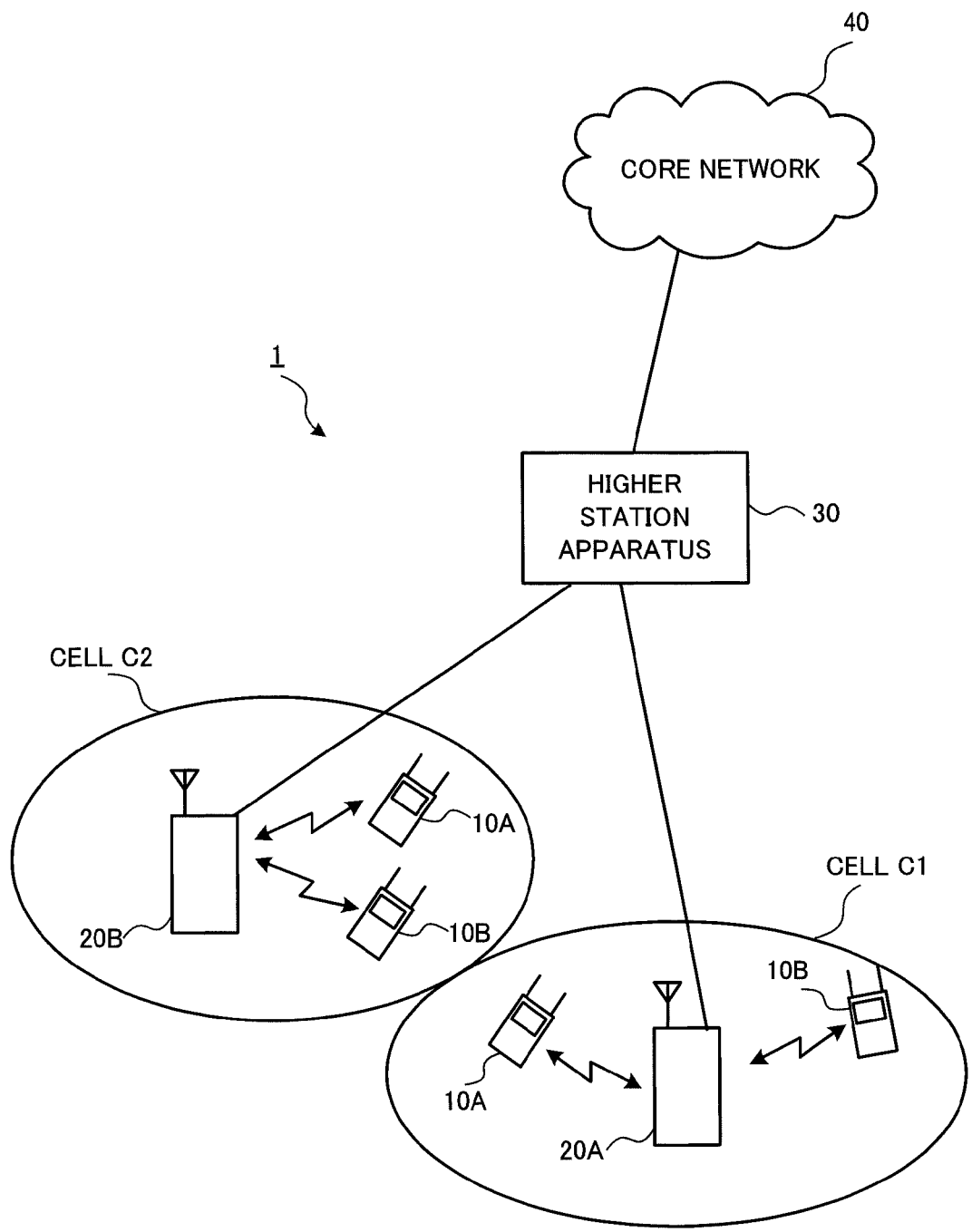
FIG. 11 is a diagram to explain a system configuration of a radio communication system according to an embodiment.

As shown in FIG. 11, the radio communication system 1 is configured to include a radio base station apparatus 20 and a plurality of user terminals 10 that communicate with this radio base station apparatus 20. The radio base station apparatus 20 is connected with a higher station apparatus 30, and this higher station apparatus 30 is connected with a core network 40. Also, the radio base station apparatuses 20 are connected with each other by wire connection or by wireless connection. The user terminals 10 are able to communicate with the radio base station apparatus 20 in cells C1 and C2. Note that the higher station apparatus 30 includes, for example, an access gateway apparatus, a radio network controller (RNC), a mobility management entity (MME) and so on, but is by no means limited to these.

Although the user terminals 10 may include LTE terminals and LTE-A terminals, the following description will be given simply with respect to user terminals, unless specified otherwise.

In the radio communication system 1, as radio access schemes, OFDMA (Orthogonal Frequency Division Multiple Access) is adopted on the downlink, and SC-FDMA (Single-Carrier Frequency Division Multiple Access) is adopted on the uplink. Note that the uplink radio access scheme is not limited to this. OFDMA is a multi-carrier transmission scheme to perform communication by dividing a frequency band into a plurality of narrow frequency bands (subcarriers) and mapping data to each subcarrier. SC-FDMA is a single carrier transmission scheme to reduce interference between terminals by dividing, per user terminal, the system band into bands formed with one or continuous resource blocks, and allowing a plurality of terminals to use mutually different bands.

Here, communication channel configurations defined in LTE-A will be described. Downlink communication channels include a PDSCH, which is used by each user terminal 10 on a shared basis, downlink L1/L2 control channels (PDCCH, PCFICH, PHICH), and extended PDCCHs. User data and higher control signals are transmitted by the PDSCH. An extended PDCCH is frequency-divided with the PDSCH, and allocated in radio resources after a predetermined number of OFDM symbols (one to three OFDM symbols) from the subframe top.

The uplink control channels include a PUSCH, which is used by each user terminal 10 on a shared basis, and a PUCCH, which is an uplink control channel. User data is transmitted by means of this PUSCH. Downlink radio quality information (CQI: Channel Quality Indicator), retransmission acknowledgement signals (ACK/NACK signals) and so on are transmitted by the PUCCH.

Figure 12:
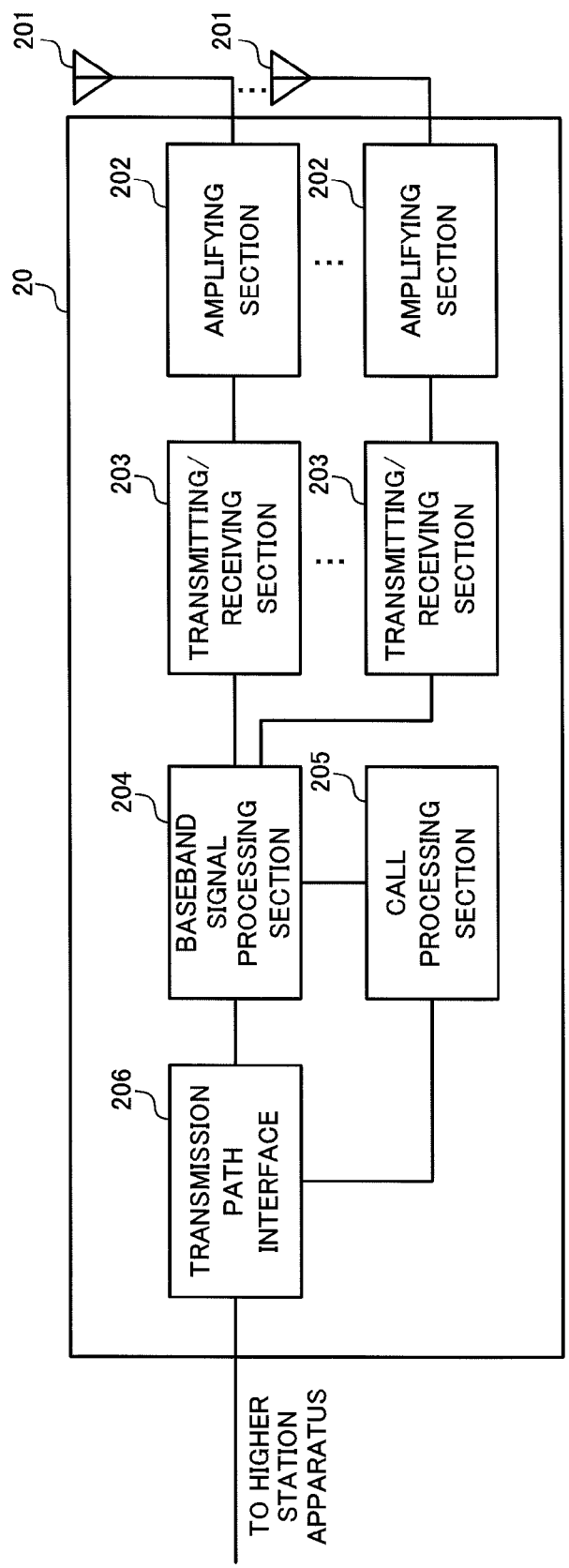
FIG. 12 is a diagram to explain an overall configuration of a radio base station apparatus according to an embodiment.

Referring to FIG. 12, an overall configuration of the radio base station apparatus 20 according to the present embodiment will be described. The radio base station apparatus 20 has a plurality of transmitting/receiving antennas 201 for MIMO transmission, amplifying sections 202, transmitting/receiving sections 203, a baseband signal processing section 204, a call processing section 205, and a transmission path interface 206. User data that is transmitted from the radio base station apparatus 20 to the user terminal is input from the higher station apparatus 30 of the radio base station apparatus 20, into the baseband signal processing section 204, via the transmission path interface 206. The baseband signal processing section 204 performs a PDCP layer process, division and coupling of user data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process, and a precoding process.

The baseband signal processing section 204 reports control information for radio communication in the cell to the user terminal 10 by a broadcast channel. The broadcast information for communication in the cell includes, for example, the system bandwidth on the uplink and the downlink, identification information of a root sequence (root sequence index) for generating signals of random access preambles of the PRACH, and so on.

The transmitting/receiving sections 203 convert the baseband signals, which have been subjected to precoding and output from the baseband signal processing section 204 on a per antenna basis, into a radio frequency band. The amplifying sections 202 amplify the radio frequency signals subjected to frequency conversion, and output the results through the transmitting/receiving antennas 201. On the other hand, as for the data to be transmitted from the user terminal 10 to the radio base station apparatus 20 on the uplink, radio frequency signals that are received in the transmitting/receiving antennas 201 are each amplified in the amplifying sections 202, converted into baseband signals by frequency conversion in the transmitting/receiving sections 203, and input in the baseband signal processing section 204.

The baseband signal processing section 204 applies, to the user data included in the baseband signals received as input, an FFT process, an IDFT process, error correction decoding, a MAC retransmission control receiving process, and RLC layer and PDCP layer receiving processes, and the results are transferred to the higher station apparatus 30 via the transmission path interface 206. The call processing section 205 performs call processing such as setting up and releasing communication channels, manages the state of the radio base station apparatus 20 and manages the radio resources.

Figure 13:
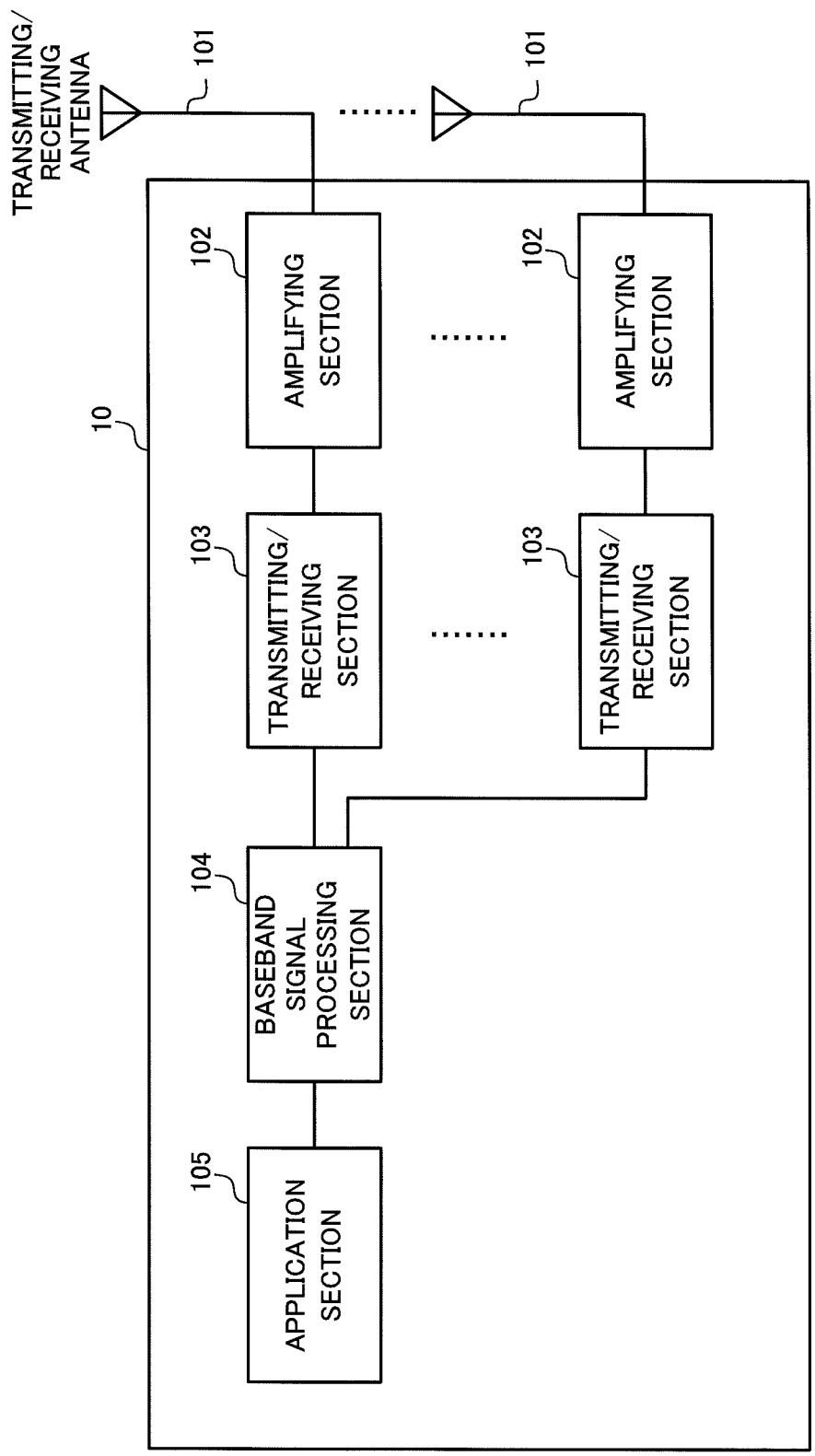
FIG. 13 is a diagram to show an overall configuration of a user terminal according to an embodiment.

Next, referring to FIG. 13, an overall configuration of a user terminal according to the present embodiment will be described. An LTE terminal and an LTE-A terminal have the same hardware configurations in principle parts, and therefore will be described indiscriminately. A user terminal 10 has a plurality of transmitting/receiving antennas 101 for MIMO transmission, amplifying sections 102, transmitting/receiving sections 103, a baseband signal processing section 104, and an application section 105.

As for downlink data, radio frequency signals that are received in a plurality of transmitting/receiving antennas 101 are each amplified in the amplifying sections 102, subjected to frequency conversion and converted into baseband signals in the transmitting/receiving sections 103. The baseband signals are subjected to receiving processes such as an FFT process, error correction decoding and retransmission control, in the baseband signal processing section 104. In this downlink data, downlink user data is transferred to the application section 105. The application section 105 performs processes related to higher layers above the physical layer and the MAC layer. Also, in the downlink data, broadcast information is also transferred to the application section 105.

On the other hand, uplink user data is input from the application section 105 into the baseband signal processing section 104. The baseband signal processing section 104 performs a retransmission control (HARQ (Hybrid ARQ)) transmission process, channel coding, precoding, a DFT process, an IFFT process, and so on, and transfers the result to each transmitting/receiving section 103.

The baseband signals that are output from the baseband signal processing section 104 is converted into a radio frequency band in the transmitting/receiving sections 103. After that, the amplifying sections 102 amplify the radio frequency signal having been subjected to frequency conversion, and transmit the results from the transmitting/receiving antennas 101.

Figure 14:
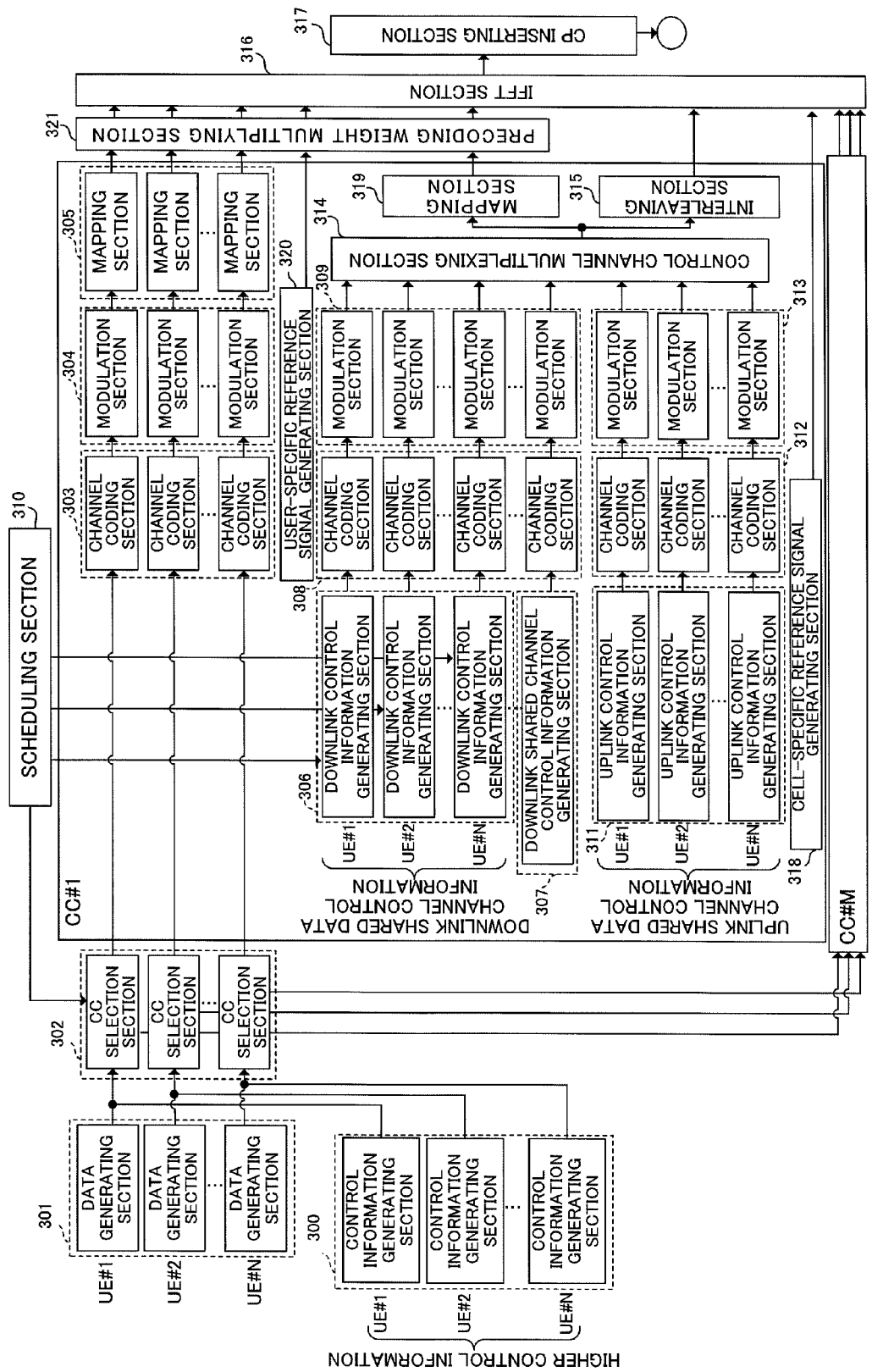
FIG. 14 is a functional block diagram showing a baseband processing section provided in a radio base station apparatus according to an embodiment, and part of higher layers.

FIG. 14 is a functional block diagram of a baseband signal processing section 204 provided in the radio base station apparatus 20 according to the present embodiment and part of the higher layers, and primarily illustrates the function blocks for transmission processes in the baseband signal processing section 204. FIG. 14 shows an example of a base station configuration which can support maximum M component carriers (CC #1 to CC #M). Transmission data for user terminals 10 under the radio base station apparatus 20 is transferred from the higher station apparatus 30 to the radio base station apparatus 20.

Control information generating sections 300 generate higher control information for performing higher layer signaling (RRC signaling), on a per user terminal basis. The higher control information includes the resource blocks (PRB positions) where extended PDCCHs (FDM-type PDCCHs) can be mapped. Also, when the above first example is adopted, user terminal-specific index numbers are generated in the control information generating sections 300. When the second example is adopted, user terminal-specific subframe pattern information is generated.

Data generating sections 301 output transmission data transferred from the higher station apparatus 30, as user data, on a per user terminal basis, separately. The component carrier selection sections 302 select component carriers to be used for radio communication with the user terminals 10, on a per user basis. An increase/decrease of component carriers is reported from the radio base station apparatus 20 to the user terminal 10 by a higher layer signal, and a message of completion of application is received from the user terminal 10.

The scheduling section 310 controls the allocation of component carriers to the user terminals 10 under control, according to the overall communication quality of the system band. Also, the scheduling section 310 schedules LTE terminal users and LTE-A terminal users separately. The scheduling section 310 receives as input transmission data and retransmission commands from the higher station apparatus 30, and also receives as input the channel estimation values and resource block CQIs from the receiving section having measured an uplink signal.

Also, the scheduling section 310 schedules uplink and downlink control information and uplink and downlink shared channel signals, with reference to the retransmission commands, channel estimation values and CQIs that have been received as input. A propagation path in radio communication varies differently per frequency, due to frequency selective fading. So, the scheduling section 310 designates resource blocks (mapping positions) of good communication quality, on a per subframe basis, with respect to the user data for each user terminal 10 (which is referred to as "adaptive frequency scheduling"). In adaptive frequency scheduling, a user terminal 10 of good propagation path quality is selected for each resource block. Consequently, the scheduling section 310 designates resource blocks (mapping positions), using the CQI of each resource block, fed back from each user terminal 10.

Likewise, the scheduling section 310 designates resource blocks (mapping positions) of good communication quality, on a per subframe basis, with respect to the control information and so on to be transmitted by extended PDCCHs, by adaptive frequency scheduling. Consequently, the scheduling section 310 designates the resource blocks (mapping positions) using the CQI of each resource block, fed back from each user terminal 10.

Also, the scheduling section 310 controls the number of aggregations in accordance with the conditions of the propagation path with the user terminal 10. For the PDCCH, the number of CCE aggregations is controlled, and, for extended PDCCHs, the number of CCE aggregations (in the event of "with cross interleaving") or the number of VRB aggregations (in the event of "without cross interleaving") is controlled. Also, the MCS (coding rate and modulation scheme) that fulfills a predetermined block error rate with the allocated resource blocks is determined. Parameters that satisfy the MCS (coding rate and modulation scheme) determined by the scheduling section 310 are set in channel coding sections 303, 308 and 312, and modulation sections 304, 309 and 313.

The baseband signal processing section 204 has channel coding sections 303, modulation sections 304 and mapping sections 305 to support the maximum number of users to multiplex, N, in one component carrier. The channel coding sections 303 perform channel coding of the downlink shared data channel (PDSCH), which is formed with user data (including part of higher layer signals) that is output from the data generating sections 301, on a per user basis. The modulation sections 304 modulate user data having been subjected to channel coding, on a per user basis. The mapping sections 305 map the modulated user data to radio resources.

Also, the baseband signal processing section 204 has uplink control information generating sections 311, channel coding sections 312, and modulation sections 313. The uplink control information generating sections 311 generate uplink scheduling grants (UL Grants) for controlling the uplink data channel (PUSCH). The uplink scheduling grants are generated on a per user basis.

The downlink control information generating sections 306 generate downlink scheduling assignments (DL assignments) for controlling the downlink data channel (PDSCH). The downlink scheduling assignments are generated on a per user basis.

Also, the baseband signal processing section 204 has a downlink shared channel control information generating section 307 that generates downlink shared control channel control information, which is downlink control information that is common between users. When the above first example is adopted, decoding control information ($DCI_N$) that indicates the user terminals to perform the decoding process for the second control region is generated.

The cell-specific reference signal generating section 318 generates a cell-specific reference signal (CRS), which is used for various purposes such as channel estimation, symbol synchronization, CQI measurement, mobility measurement, and so on. Also, the user-specific reference signal generating section 320 generates DM-RSs, which are user-specific downlink demodulation reference signals. The user-specific downlink demodulation reference signals (DM-RSs) are multiplexed on the radio resources of the above PDSCH region and transmitted.

The control information that is modulated on a per user basis in the modulation sections 309 and 313 is multiplexed in the control channel multiplexing section 314. In the control channel multiplexing section 314, downlink control information and decoding control information for the existing PDCCH are allocated in the first control region, which is one to three OFDM symbols from the subframe top, and are interleaved in the interleaving section 315. On the other hand, downlink control information for an extended PDCCH is allocated in a second control region, which is frequency-divided with a data region in a region after a predetermined number of symbols in the subframe, and is mapped to resource blocks (PRBs) in the mapping section 319. In this case, the mapping section 319 performs the mapping based on commands from the scheduling section 310. Note that the mapping section 319 may perform mapping not only by adopting "with cross interleaving," but also by adopting "without cross interleaving."

The precoding weight multiplying section 321 controls (shifts) the phase and/or amplitude of the transmission data and user-specific demodulation reference signals (DM-RSs) that are mapped to the subcarriers, for each of a plurality of antennas. The transmission data and user-specific demodulation reference signals (DM-RSs) having been subjected to a phase and/or amplitude shift in the precoding weight multiplying section 321 are output to an IFFT section 316.

The IFFT section 316 receives as input control signals from the interleaving section 315 and the mapping section 319, and receives as input user data from the mapping sections 305. The IFFT section 316 performs an inverse fast Fourier transform of the downlink channel signal and converts the frequency domain signals into time domain signals. A cyclic prefix inserting section 317 inserts cyclic prefixes in the time sequence signal of the downlink channel signal. Note that a cyclic prefix functions as a guard interval for cancelling the differences in multipath propagation delay. Transmission data, to which cyclic prefixes have been added, is transmitted to the transmitting/receiving sections 203.

Figure 15:
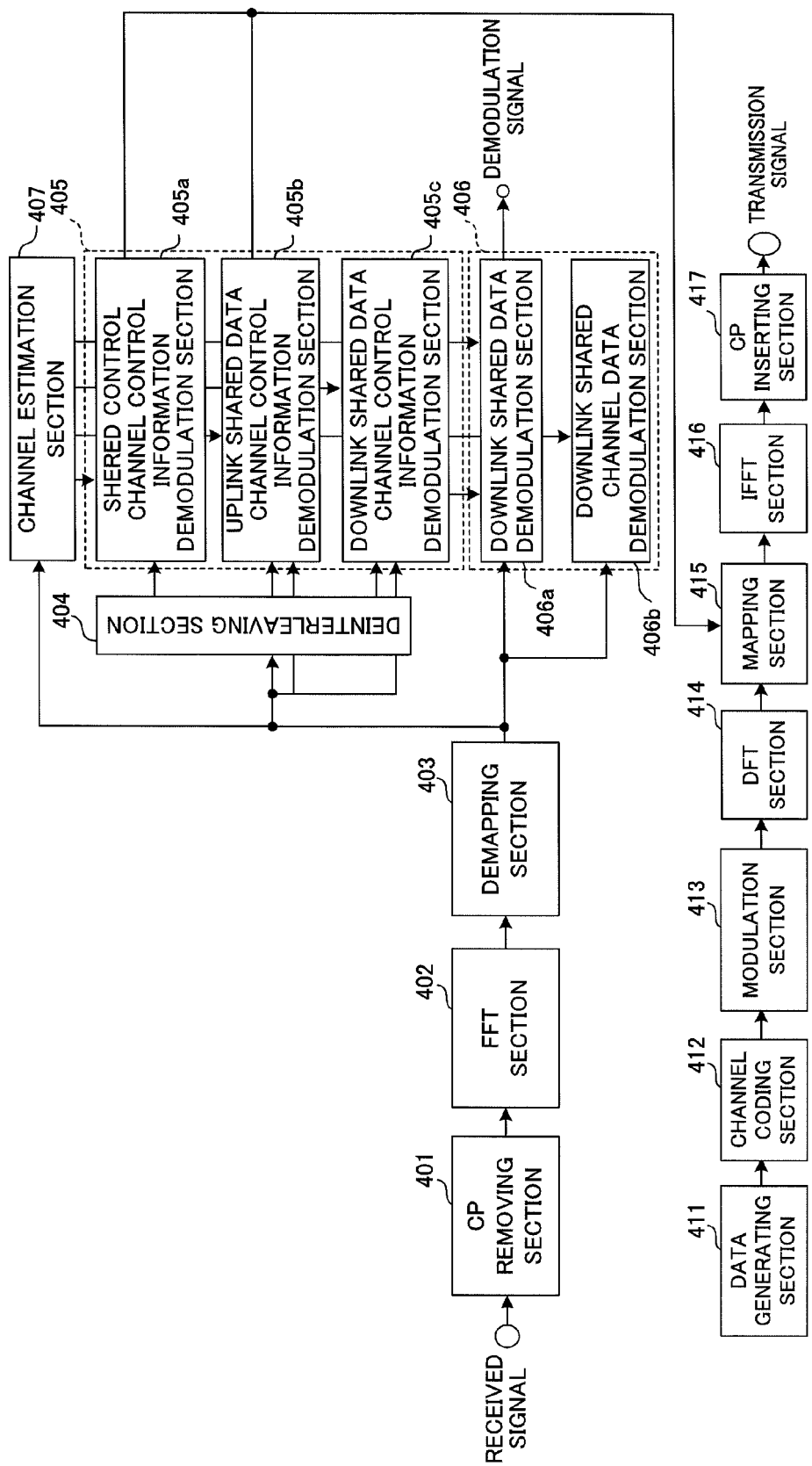
FIG. 15 is a functional block diagram of a baseband processing section of a user terminal according to an embodiment.

FIG. 15 shows a functional block diagram of the baseband signal processing section 104 provided in a user terminal 10 and shows the function blocks of an LTE-A terminal that supports LTE-A.

A downlink signal that is received as received data from the radio base station apparatus has the CPs removed in a CP removing section 401. The downlink signal, from which the CPs have been removed, is input in an FFT section 402. The FFT section 402 performs a fast Fourier transform (FFT) on the downlink signal, converts the time domain signal into a frequency domain signal and inputs this signal in a demapping section 403. The demapping section 403 demaps the downlink signal, and extracts, from the downlink signal, multiplex control information in which a plurality of pieces of control information are multiplexed, user data and higher control signals. Note that the demapping process by the demapping section 403 is performed based on higher control signals that are received as input from the application section 105. The multiplex control information that is output from the demapping section 403 is deinterleaved in a deinterleaving section 404. Note that it is also possible to provide a configuration in which an extended PDCCH signal that is not interleaved is input as is in a control information demodulation section 405, without involving the de-interleaving section 404.

Also, the baseband signal processing section 104 has a control information demodulation section 405 that demodulates control information, a data demodulation section 406 that demodulates downlink shared data, and a channel estimation section 407. The control information demodulation section 405 includes a shared control channel control information demodulation section 405a that demodulates downlink shared control channel control information from multiplex control information, an uplink shared data channel control information demodulation section 405b that demodulates uplink shared data channel control information from multiplex control information, and a downlink shared data channel control information demodulation section 405c that demodulates downlink shared data channel control information from multiplex control information. The data demodulation section 406 includes a downlink shared data demodulation section 406a that demodulates the user data and higher control signals, and a downlink shared channel data demodulation section 406b that demodulates downlink shared channel data.

The shared control channel control information demodulation section 405a extracts shared control channel control information, which is control information that is common between users, by the blind decoding process, demodulation process, channel decoding process and so on of the common search space of the downlink control channel (PDCCH). The shared control channel control information includes downlink channel quality information (CQI), and therefore is input in a mapping section 415 and mapped as part of transmission data for the radio base station apparatus 20.

When the above first example is adopted, the shared control channel control information demodulation section 405a extracts decoding control information ($DCI_N$) that indicates the user terminals to perform the decoding process for the second control region. Then, based on the decoding control information that is extracted, whether or not to perform the decoding process for the control signal allocated in the second control region is controlled. At this time, it is possible to determine whether or not to perform blind decoding for the control signal of the second control region, based on the index numbers and decoding control information reported by higher layer signals.

The uplink shared data channel control information demodulation section 405b extracts uplink shared data channel control information (for example, the UL grant) by the blind decoding process, demodulation process, channel decoding process and so on of the user-specific search space of the downlink control channel (PDCCH). The demodulated uplink shared data channel control information is input in the mapping section 415 and is used to control the uplink shared data channel (PUSCH).

The downlink shared data channel control information demodulation section 405c extracts user-specific downlink shared data channel control information (for example, DL assignment) by the blind decoding process, demodulation process, channel decoding process and so on of the user-specific search space of the downlink control channel (PD-CCH). The demodulated downlink shared data channel control information is input in the downlink shared data demodulation section 406a, is used to control the downlink shared data channel (PDSCH), and is input in the downlink shared data demodulating section 406a.

In the control information demodulation section 405, in the event of an existing PDCCH and an extended PDCCH where "with cross interleaving" is applied, the blind decoding process is performed for a plurality of CCE candidates. Also, in the event of an extended PDCCH where "without cross interleaving" is applied, the blind decoding process is performed with respect to a plurality of VRB candidates.

The downlink shared data demodulation section 406a acquires user data and higher control information based on downlink shared data channel control information that is input from the downlink shared data channel control information demodulation section 405c. The downlink shared channel data demodulation section 406b demodulates downlink shared channel data based on the uplink shared data channel control information that is input from the uplink shared data channel control information demodulation section 405b.

The channel estimation section 407 performs channel estimation using user-specific reference signals (DM-RSs) or cell-specific reference signals (CRSs). When demodulating the existing PDCCH and an extended PDCCH where "with cross interleaving" is applied, channel estimation is performed using the cell-specific reference signals. On the other hand, when demodulating an extended PDCCH and user data where "without cross interleaving" is applied, channel estimation is performed using the DM-RSs and CRSs. The estimated channel variation is output to the shared control channel control information demodulation section 405a, the uplink shared data channel control information demodulation section 405b, the downlink shared data channel control information demodulation section 405c and the downlink shared data demodulation section 406a. In these demodulation sections, demodulation processes are performed using estimated channel variation and reference signals for demodulation.

The baseband signal processing section 104 has, as function blocks of the transmission processing system, a data generating section 411, a channel coding section 412, a modulation section 413, a DFT section 414, a mapping section 415, an IFFT section 416, and an CP inserting section 417. The data generating section 411 generates transmission data from bit data that is received as input from the application section 105. The channel coding sections 412 performs channel coding processes such as error correction for the transmission data, and the modulation section 413 modulates the transmission data after channel coding by QPSK and so on.

The DFT section 414 performs a discrete Fourier transform on the modulated transmission data. The mapping section 415 maps the frequency components of the data symbols after the DFT to subcarrier positions designated by the radio base station apparatus 20. The IFFT section 416 converts the input data, which corresponds to the system band, into time sequence data, by performing an inverse fast Fourier transform, and the CP inserting section 417 inserts cyclic prefixes in the time sequence data in data units.

As described above, in the radio communication system of the present embodiment, the radio base station apparatus generates downlink control information in the downlink control information generating section 306 and the uplink control information generating section 311, and also generates decoding control information that indicates the user terminals to perform the decoding process for the second control region in the downlink shared channel control information generating section 307. Then, in the control channel multiplexing section 314, which functions as an allocation section, downlink control information that is generated is allocated in the first control region and the second control region, and, also allocates the decoding control information in the first control region, and, after this, transmits these to user terminals. The user terminals receive control signals including the downlink control information and the decoding control information from the radio base station apparatus, and perform blind decoding in the control information demodulation section 405.

When the above first example is applied, a user terminal apparatus extracts decoding control information by decoding the control signal allocated in the first control region, in the control information demodulation section 405, and controls the decoding process of the downlink control signal allocated in the second control region based on the decoding control information. In this case, the user terminal is able to determine whether or not to perform blind decoding for the control signal of the second control region based on the index number and decoding control information reported by a higher layer signal.

Now, although the present invention has been described in detail with reference to the above embodiments, it should be obvious to a person skilled in the art that the present invention is by no means limited to the embodiments described herein. The present invention can be implemented with various corrections and in various modifications, without departing from the spirit and scope of the present invention defined by the recitations of the claims. Consequently, the descriptions herein are provided only for the purpose of explaining examples, and should by no means be construed to limit the present invention in any way.

The disclosure of Japanese Patent Application No. 2011-156243, filed on Jul. 15, 2011, including the specification, drawings and abstract, is incorporated herein by reference in its entirety.

The invention claimed is:

1. A radio communication system comprising:
   a radio base station apparatus comprising:
      an allocation section that allocates downlink control information to a first control region from a top to a predetermined OFDM symbol in a subframe, and also allocates, in a specific subframe, downlink control information to a second control region that is frequency-divided with a data region; and
      a transmission section that transmits information indicating whether a user terminal needs to decode downlink control information in the specific subframe, the downlink control information allocated in the first control region and the downlink control information allocated in the second control region; and
   the user terminal comprising:
      a receiving section that receives the information indicating the specific subframe, the downlink control information of the first control region, and the downlink control information of the second control region from the radio base station apparatus; and
      a decoding section that decodes the downlink control information of the first control region and decodes the downlink control information of the second control region based on the information indicating the specific subframe, wherein, for allocation of the downlink control information to the second control region, there are defined in advance a first method of allocating a plurality of resource element groups constituting a control channel element used for the downlink control information of the second control region to over a plurality of physical resource blocks (PRBs) and a second method of allocating the downlink control information of the second control region in PRB units, and the allocation section performs the allocation by selecting either the first method or the second method, and wherein the transmission section provides the information indicating the specific subframe in which the second control region is configured to the user terminal by higher layer signals.

2. The radio communication system according to claim 1, wherein the transmission section further transmits information about resource blocks to configure the second control region in the specific subframe by higher layer signaling.

3. A radio base station apparatus comprising:

an allocation section that allocates downlink control information to a first control region from a top to a predetermined OFDM symbol in a subframe, and also allocates, in a specific subframe, downlink control information to a second control region that is frequency-divided with a data region; and a transmission section that transmits information indicating whether a user terminal needs to decode downlink control information in the specific subframe, the downlink control information allocated in the first control region and the downlink control information allocated in the second control region to the user terminal, wherein, for allocation of the downlink control information to the second control region, there are defined in advance a first method of allocating a plurality of resource element groups constituting a control channel element used for the downlink control information of the second control region to over a plurality of physical resource blocks (PRBs) and a second method of allocating the downlink control information of the second control region in PRB units, and the allocation section performs the allocation by selecting either the first method or the second method, and wherein the transmission section provides the information indicating the specific subframe in which the second control region is configured to the user terminal by higher layer signals.

4. A user terminal comprising:

a receiving section that receives downlink control information that is allocated to a first control region from a top to a predetermined OFDM symbol in a subframe, downlink control information that is allocated to a second control region that is frequency-divided with a data region in a specific radio frame, and information indicating the specific subframe; and a decoding section that decodes the downlink control information of the first control region and decodes the downlink control information of the second control region based on the information indicating the specific subframe, wherein the receiving section receives the information indicating whether the user terminal needs to decode downlink control information in the specific subframe in which the second control region is configured, by higher layer signals, and wherein, for allocation of the downlink control information to the second control region, there are defined in advance a first method of allocating a plurality of resource element groups constituting a control channel element used for the downlink control information of the second control region to over a plurality of physical resource blocks (PRBs) and a second method of allocating the downlink control information of the second control region in PRB units, and the allocation is performed by selecting either the first method or the second method.

5. A radio communication method between a radio base station apparatus and a user terminal, comprising the steps of:

in the radio base station apparatus, allocating downlink control information to a first control region from a top to a predetermined OFDM symbol in a subframe and also allocating, in a specific subframe, downlink control information to a second control region that is frequency-divided with a data region; and transmitting information indicating whether the user terminal needs to decode downlink control information in the specific subframe, the downlink control information allocated in the first control region and the downlink control information allocated in the second control region; and in the user terminal, receiving the information indicating the specific subframe, the downlink control information of the first control region and the downlink control information of the second control region from the radio base station apparatus; and decoding the downlink control information of the first control region and decoding the downlink control information of the second control region based on the information indicating the specific subframe, wherein, for allocation of the downlink control information to the second control region, there are defined in advance a first method of allocating a plurality of resource element groups constituting a control channel element used for the downlink control information of the second control region to over a plurality of physical resource blocks (PRBs) and a second method of allocating the downlink control information of the second control region in PRB units, and the radio base station apparatus performs the allocation by selecting either the first method or the second method, and wherein the radio base station apparatus provides the information indicating the specific subframe in which the second control region is configured to the user terminal by higher layer signals.

* * * * *